United States Patent
Choi (10) Patent No.: US 12,227,146 B2
(45) Date of Patent: Feb. 18, 2025

(54) VEHICLE AND METHOD FOR PICKING UP SHIPMENT USING THE SAME

(71) Applicants: Hyundai Motor Company, Seoul (KR); Kia Corporation, Seoul (KR)

(72) Inventor: Young Jin Choi, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 205 days.

(21) Appl. No.: 17/896,294

(22) Filed: Aug. 26, 2022

(65) Prior Publication Data
US 2023/0174014 A1 Jun. 8, 2023

(30) Foreign Application Priority Data
Dec. 7, 2021 (KR) .................. 10-2021-0174120

(51) Int. Cl.
| | | |
|---|---|---|
| B60R 25/23 | (2013.01) | |
| B60H 1/00 | (2006.01) | |
| B60R 25/01 | (2013.01) | |
| G06Q 10/08 | (2024.01) | |
| G06Q 10/0832 | (2023.01) | |

(52) U.S. Cl.
CPC ......... *B60R 25/23* (2013.01); *B60H 1/00735* (2013.01); *B60R 25/01* (2013.01); *G06Q 10/0832* (2013.01)

(58) Field of Classification Search
CPC ..... B60R 25/23; B60R 25/01; B60H 1/00735; G06Q 10/0832
USPC ........................................................ 701/2
See application file for complete search history.

(56) References Cited

U.S. PATENT DOCUMENTS

| | | | | |
|---|---|---|---|---|
| 7,455,225 B1 * | 11/2008 | Hadfield | ................ | G07C 5/085 235/444 |
| 8,286,437 B2 * | 10/2012 | Sanders | ................ | F25D 29/003 62/62 |
| 10,611,211 B2 * | 4/2020 | Lee | .................... | B60H 1/00778 |

(Continued)

FOREIGN PATENT DOCUMENTS

| | | | | | |
|---|---|---|---|---|---|
| WO | WO-2014116320 A1 * | 7/2014 | ........... | G06Q 10/083 |
| WO | WO-2019203789 A1 * | 10/2019 | ......... | G06Q 10/0832 |

OTHER PUBLICATIONS

K.H. Leung et al., "Design of a Case-Based Multi-Agent Wave Picking Decision Support System for Handling E-Commerce Shipments," 2016, Publisher: IEEE.*

(Continued)

*Primary Examiner* — Tuan C To
(74) *Attorney, Agent, or Firm* — Slater Matsil, LLP (57) ABSTRACT

An embodiment vehicle includes a communication device configured to communicate with a device outside the vehicle, an external user interface configured to be activated based on a shipment pickup request received through the communication device, a temperature adjustment device configured to adjust an indoor temperature based on receipt of a shipment targeted for the shipment pickup request, and a controller configured to activate the external user interface in response to the shipment pickup request, open a door of the vehicle based on information entered through the external user interface being a password, and control the temperature adjustment device based on information about the shipment.

20 Claims, 10 Drawing Sheets

(56) References Cited

U.S. PATENT DOCUMENTS

| | | | |
|---|---|---|---|
| 2013/0138573 A1* | 5/2013 | Klingenberg | G06Q 10/083 |
| | | | 705/330 |
| 2017/0352000 A1* | 12/2017 | Bender | G06Q 10/0832 |
| 2018/0244130 A1* | 8/2018 | Lee | B60H 1/00778 |
| 2019/0087775 A1* | 3/2019 | Buehre | G06Q 10/0833 |
| 2019/0250653 A1* | 8/2019 | Conlon | G06Q 10/0832 |
| 2020/0286038 A1* | 9/2020 | Yamashita | G07C 5/0816 |
| 2020/0342392 A1* | 10/2020 | Godwin | B65G 1/1378 |
| 2021/0132784 A1* | 5/2021 | Conlon | G06Q 10/0833 |
| 2021/0182791 A1* | 6/2021 | Saenz | G06Q 10/08355 |
| 2021/0304137 A1* | 9/2021 | Kursar | B60Q 3/30 |
| 2022/0114544 A1* | 4/2022 | McAlister | G06Q 10/0838 |
| 2022/0269268 A1* | 8/2022 | Lau | G06Q 10/083 |
| 2023/0166621 A1* | 6/2023 | Brandon | B60L 53/62 |
| | | | 320/109 |

OTHER PUBLICATIONS

Fu-Shiung et al., "Decision Support for Vehicle Routing Problem with Arbitrary Pickup/Delivery Points," 2015, Publisher: IEEE.*

* cited by examiner

VEHICLE AND METHOD FOR PICKING UP SHIPMENT USING THE SAME

CROSS-REFERENCE TO RELATED APPLICATIONS

This application claims the benefit of Korean Patent Application No. 10-2021-0174120, filed on Dec. 7, 2021, which application is hereby incorporated herein by reference.

TECHNICAL FIELD

The present disclosure relates to a vehicle and a method for picking up a shipment by using the vehicle.

BACKGROUND

The consumption pattern is changing from a way to purchase goods mainly in offline stores to a way to purchase goods through online shopping. In addition to a way to purchase goods shipped from factories online, nowadays, the use of platforms for delivering food and the like is increasing.

According to the way to purchase goods online, it may be possible to search for many goods within a short time and to reduce the hassle of going to offline stores.

However, when purchasing items online, the shipment may be stolen because the time to pick up the shipment is uncertain.

Also, when the time to pick up the shipment is uncertain, the quality of temperature-sensitive products such as frozen food or refrigerated food may change after delivered.

Accordingly, there is a need for a way to pick up the shipment more safely and without the degradation of the quality of shipment.

SUMMARY

The present disclosure relates to a vehicle and a method for picking up a shipment by using the vehicle. Particular embodiments relate to a technology capable of picking up a shipment safely depending on an item characteristic.

Embodiments of the present disclosure can solve problems occurring in the prior art while advantages achieved by the prior art are maintained intact.

An embodiment of the present disclosure provides a vehicle capable of picking up shipments more safely, and a method for picking up shipments by using the vehicle.

An embodiment of the present disclosure provides a vehicle capable of preventing the degradation of the quality of a shipment due to a temperature change, and a method for picking up shipments by using the vehicle.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a vehicle may include a communication device, an external user interface, a temperature adjustment device, and a controller. The communication device may perform communication with the outside, the external user interface may be activated based on a shipment pickup request received through the communication device, and the temperature adjustment device may adjust an indoor temperature based on a shipment targeted for the shipment pickup request being received. The controller may activate the external user interface in response to the shipment pickup request, may open a door based on information entered through the external user interface being a password, and may control the temperature adjustment device based on information of the shipment.

In an embodiment, the controller may receive the password through the communication device and may open the door based on information entered through the external user interface being the password.

In an embodiment, the controller may receive information about an input time limit of the password in the process of receiving the shipment receipt request and may activate the external user interface during the input time limit.

In an embodiment, the external user interface may be implemented with a touch panel exposed on at least a portion of an outer region of the vehicle.

In an embodiment, the controller may control a speaker to guide a storage position of the shipment in the process of opening the door of the vehicle.

In an embodiment, the controller may obtain an indoor image where the shipment is located after opening the door of the vehicle and may send the indoor image thus obtained to a user terminal.

In an embodiment, the controller may check a storage temperature of the shipment from the shipment pickup request and may control the temperature adjustment device based on the storage temperature.

In an embodiment, the controller may perform artificial intelligence learning on the shipment information to extract a storage temperature of the shipment and may control the temperature adjustment device based on the storage temperature.

In an embodiment, the temperature adjustment device may include at least one of an air conditioning device, a refrigerator, or a warmer.

In an embodiment, the controller may determine an operable time of a battery powering the temperature adjustment device, may determine a time to take the shipment, and may set a driving time of the temperature adjustment device such that the driving time of the temperature adjustment device is set to the battery-operable time or less.

According to an embodiment of the present disclosure, a shipment pickup method using a vehicle may include receiving a shipment pickup request, activating an external user interface of the vehicle in response to the shipment pickup request, opening a door of the vehicle based on information entered through the external user interface being a password, and adjusting a temperature in the vehicle based on information about a shipment received in the vehicle through the door thus opened.

In an embodiment, the receiving of the shipment pickup request may include receiving the password.

In an embodiment, the receiving of the shipment pickup request may further include receiving information about an input time limit of the password.

In an embodiment, the activating of the external user interface may include activating a touch panel exposed on at least a portion of an outer region of the vehicle.

In an embodiment, the opening of the door of the vehicle may include operating a speaker of the vehicle, and guiding a storage position of the shipment through the speaker.

In an embodiment, the method may further include obtaining an indoor image where the shipment is located and sending the indoor image thus obtained to a user terminal, after opening the door of the vehicle.

In an embodiment, the receiving of the shipment pickup request may include receiving information about a storage temperature of the shipment.

In an embodiment, the adjusting of the temperature in the vehicle may include performing artificial intelligence learning on the shipment information to extract information about a storage temperature of the shipment and adjusting the temperature in the vehicle based on the storage temperature.

In an embodiment, the adjusting of the temperature in the vehicle may include controlling a temperature adjustment device including at least one of an air conditioning device, a refrigerator, or a warmer.

In an embodiment, the adjusting of the temperature in the vehicle may further include determining an operable time of a battery powering the temperature adjustment device, determining a time to take the shipment, and setting a driving time of the temperature adjustment device such that the driving time of the temperature adjustment device is set to the battery-operable time or less.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Below, various embodiments of the present disclosure will be described in detail with reference to FIGS. 1 to 10.

Figure 1:
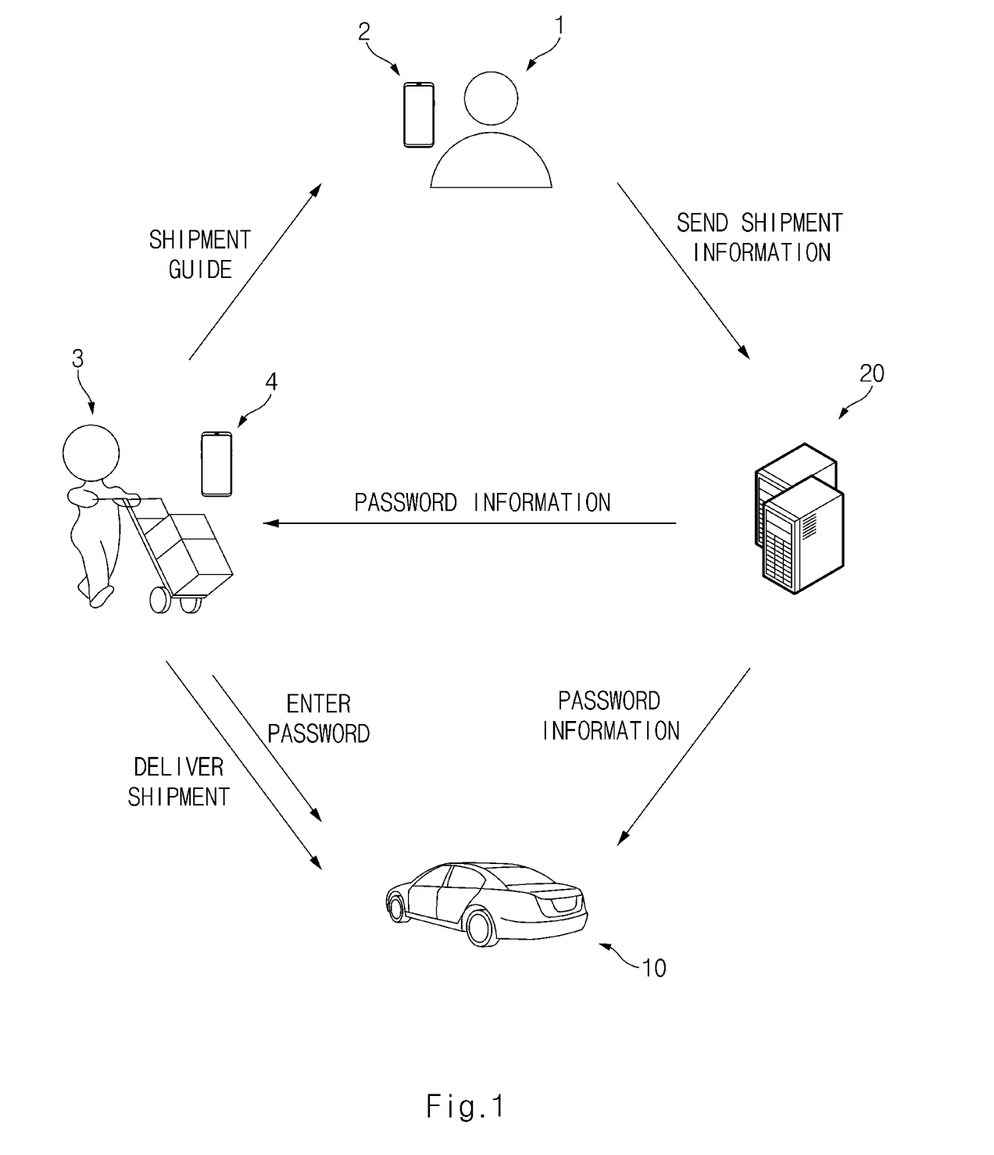
FIG. 1 is a diagram describing a shipment pickup system using a vehicle according to an embodiment of the present disclosure.
Figure 2:
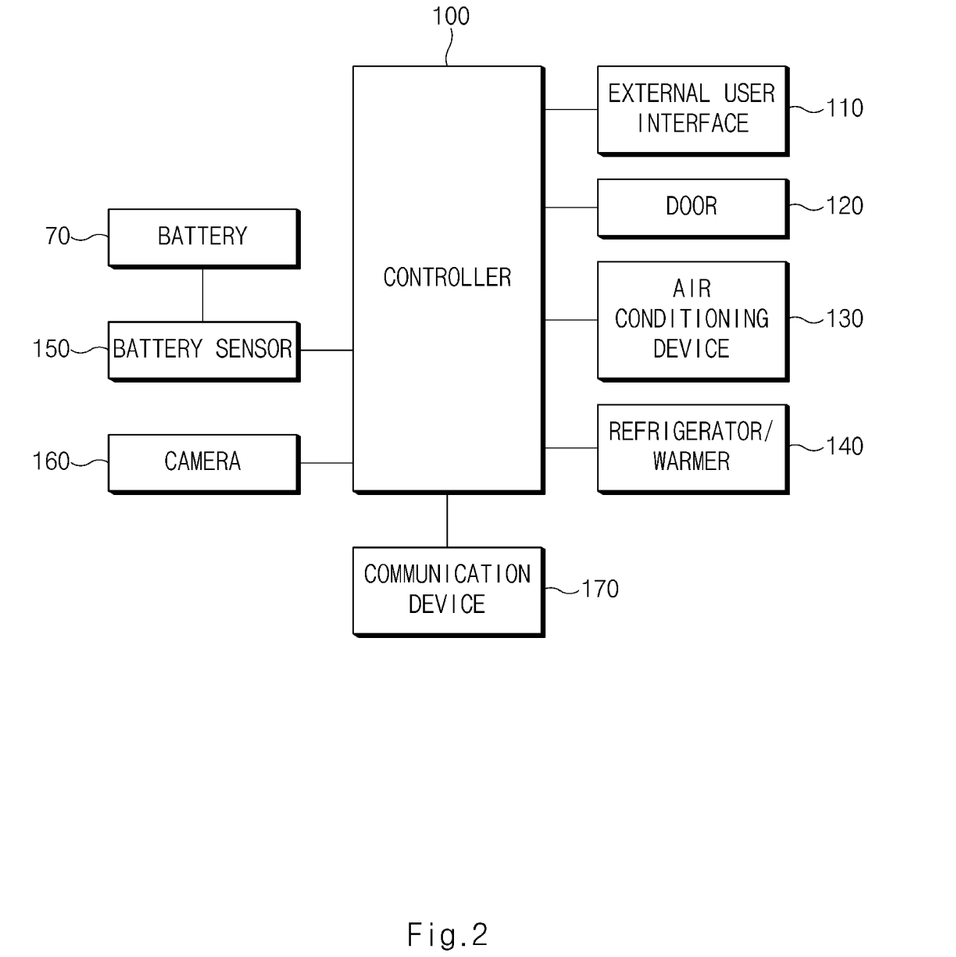
FIG. 2 is a block diagram illustrating a main configuration of a vehicle according to an embodiment of the present disclosure.

FIG. 1 is a diagram describing a shipment pickup system using a vehicle according to an embodiment of the present disclosure, and FIG. 2 is a block diagram illustrating a main configuration of a vehicle according to an embodiment of the present disclosure.

Referring to FIGS. 1 and 2, according to an embodiment of the present disclosure, a shipment pickup system using a vehicle may include a user terminal 2, a vehicle 10, and a server 20.

The user terminal 2 may be a portable terminal of the user, and the user may be a recipient of the shipment. The user terminal 2 may include a smartphone, a tablet personal computer (PC), or a laptop computer. The shipment may be a manufactured product or delivery food that the user orders through a wired/wireless call or an application of the user terminal 2. The user terminal 2 may receive shipping guide information from a shipper terminal 4, and the shipper terminal 4 may be a portable terminal of a home-delivery driver or a delivery driver. The user terminal 2 may transmit information about a receipt place of the shipment, which is selected by the user, to the server 20. According to an embodiment of the present disclosure, the user terminal 2 may send information about a shipment receipt place, which is selected to be the vehicle 10, to the server 20. When the shipment receipt place is the vehicle 10, the user terminal 2 may send a detailed parking position of the vehicle 10.

When the shipment receipt place is the vehicle 10, the server 20 may create a password for checking a shipper 3 permitted to open the vehicle 10.

The shipper 3 may open a door 120 of the vehicle 10 by using the password provided from the server 20 and may put the shipment into the vehicle 10.

The vehicle 10 may check the shipper 3 to open the door 120 and may control an air conditioning device 130 depending on a kind of the shipment. To this end, the vehicle 10 may include a controller 100, an external user interface 110, the door 120, the air conditioning device 130, a refrigerator/warmer 140, a battery 70, a battery sensor 150, and a camera 160.

The controller 100 may activate the external user interface 110 in response to a shipment receipt request. The controller 100 may check that a password is input through the external user interface 110 and may open the door 120 based on the password being input.

Also, the controller 100 may check information of the shipment and may control a temperature adjustment device based on the shipment information. The temperature adjustment device may include at least one of the air conditioning device 130 or the refrigerator/warmer 140 or may include the air conditioning device 130 and the refrigerator/warmer 140. For example, the controller 100 may control the air conditioning device 130 to adjust a temperature in a vehicle. Also, when the shipment is stored in the refrigerator/warmer 140, the controller 100 may control the refrigerator/warmer 140 to maintain a temperature of the shipment.

In addition, the controller 100 may control the camera 160 capable of monitoring the interior of a vehicle, and may determine a receipt position of the shipment based on an image obtained through the camera 160.

The controller 100 according to an embodiment of the present disclosure may be implemented in a vehicle. In this case, the controller 100 may be integrally implemented with control units in the vehicle or may be implemented as a separate device and may be connected with the control units of the vehicle by a separate connection means.

The external user interface 110 may be used to receive information input from the outside of the vehicle 10 and may include, for example, a touch panel exposed on an outer surface of a window. The external user interface 110 may be formed on the entire outer surface of the window or may be formed in a partial region of the outer surface of the window. The external user interface 110 may be activated based on a shipment pickup request, under control of the controller 100.

The air conditioning device 130 may be used to adjust thermal circulation in a vehicle and may include an air conditioner for cooling and heating control. The refrigerator/warmer 140 may be an integrated component in which functions of a refrigerator and a warmer are able to be performed. In the specification, the refrigerator/warmer 140 may refer to a refrigerator or a warmer separated from each other.

The battery 70 may supply a power to automotive parts in a vehicle. For example, the battery 70 may provide a power necessary to drive the air conditioning device 130 and the refrigerator/warmer 140.

The battery sensor 150 may include a sensor that measures battery information such as a voltage, a current, an internal resistance, a state of charge (hereinafter referred to as SOC).

The camera 160 may be used to obtain an image of the interior of a vehicle. The camera 160 may be replaced with any other component capable of monitoring the interior of a vehicle and detecting an object.

A communication device 170 may be a module that performs communication with an external device. The communication device 170 according to an embodiment of the present disclosure may communicate with the user terminal 2, the shipper terminal 4, and the server 20.

The communication device 170 may perform functions associated with short range communication, GPS signal reception, V2X communication, optical communication, broadcasting transmission and reception, and intelligent transport systems (ITS) communication.

Also, the communication device 170 may include a module supporting wireless communication between the vehicle 10 and the server 20 (i.e., V2I (Vehicle to Infrastructure), between the vehicle 10 and a vehicle (i.e., V2V (Vehicle to Vehicle)), or between the vehicle 10 and a pedestrian (i.e., V2P (Vehicle to Pedestrian)), that is, a V2X communication module.

An overall operation of each module of the communication device 170 may be controlled by a separate processor provided in the communication device 170. The communication device 170 may include a plurality of processors or may operate under control of the controller 100.

Below, a vehicle-based shipment pickup method according to an embodiment of the present disclosure will be described with reference to FIG. 3.

Figure 3:
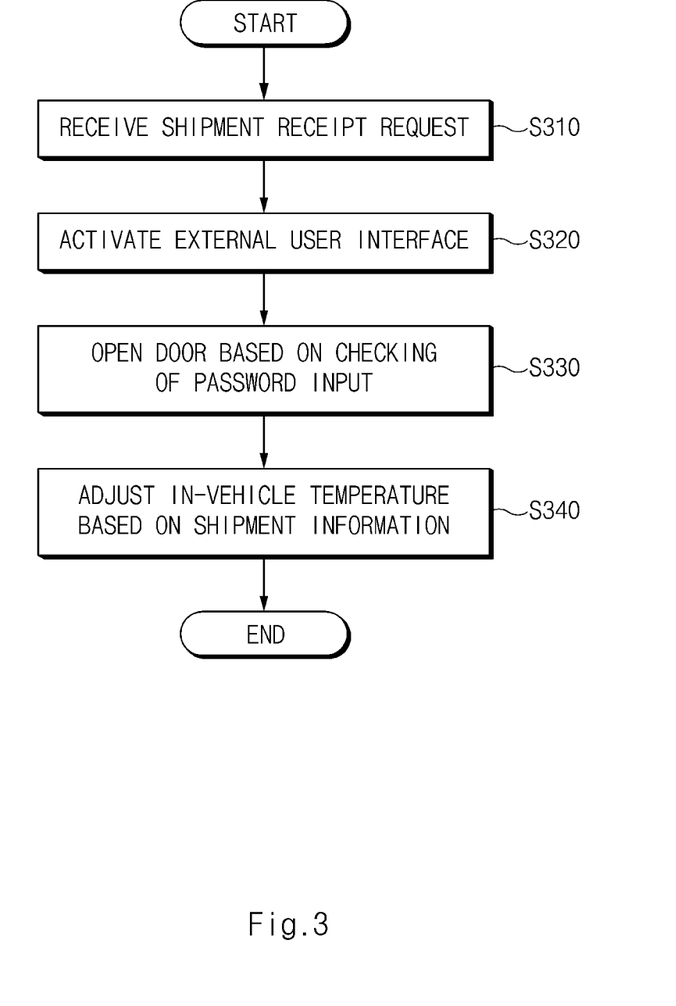
FIG. 3 is a flowchart describing a shipment pickup method using a vehicle, according to an embodiment of the present disclosure.

FIG. 3 is a flowchart describing a shipment pickup method using a vehicle, according to an embodiment of the present disclosure.

Referring to FIG. 1, in S310, the communication device 170 of the vehicle 10 may receive a shipment pickup request.

The communication device 170 may receive the shipment pickup request from the server 20. Alternatively, the communication device 170 may receive the shipment pickup request from the user terminal 2 or the shipper terminal 4. The shipment pickup request may include password information and shipment information. The password information may include a password for confirming a shipper and an input time limit of the password. The shipment information may include a kind, a size, and a storage temperature of the shipment.

In S320, the controller 100 may activate the external user interface 110 in response to the shipment pickup request. The activating of the external user interface 110 may include notifying an input region of the external user interface 110.

Figure 4:
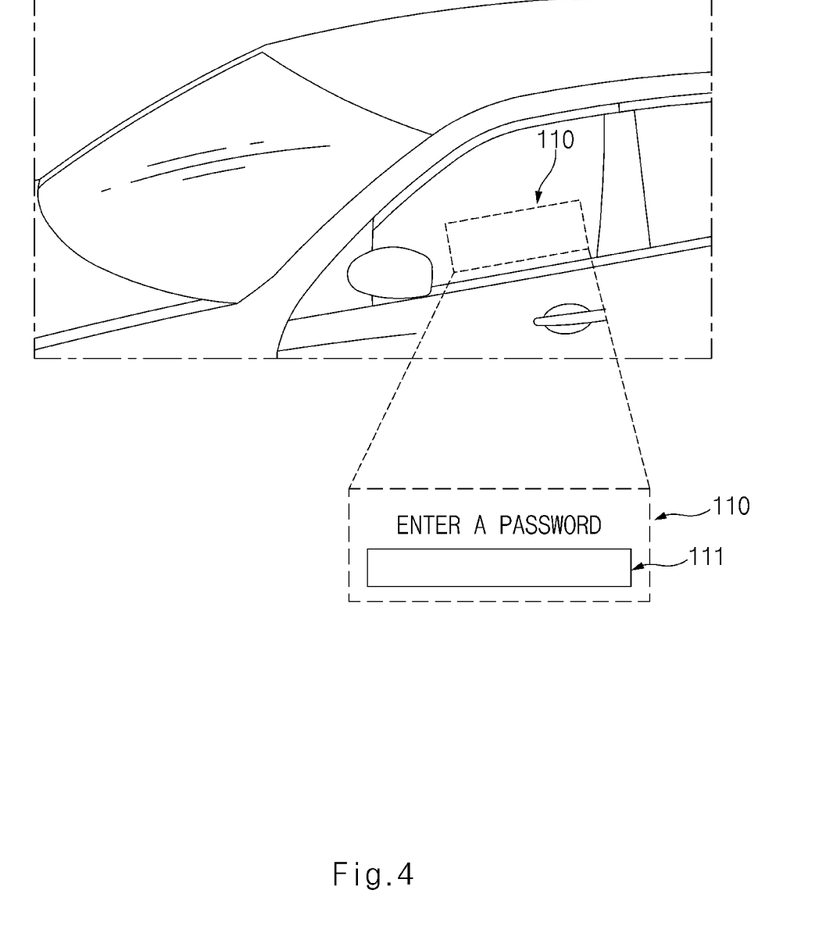
FIG. 4 is a diagram describing how an external user interface is activated.

FIG. 4 is a diagram describing how an external user interface is activated. As illustrated in FIG. 4, the external user interface 110 may be implemented with a transparent display coupled to a touch panel. The controller 100 may activate the external user interface 110 and may guide an input region 111 for entering a password together with a message guiding a password input. In a shipment pickup method according to an embodiment of the present disclosure, the external user interface 110 may be activated during an input time limit of a password, and the controller 100 may guide the input time limit of the password through the external user interface 110.

In S330, the controller 100 may open the door 120 based on the password being received.

Figure 5:
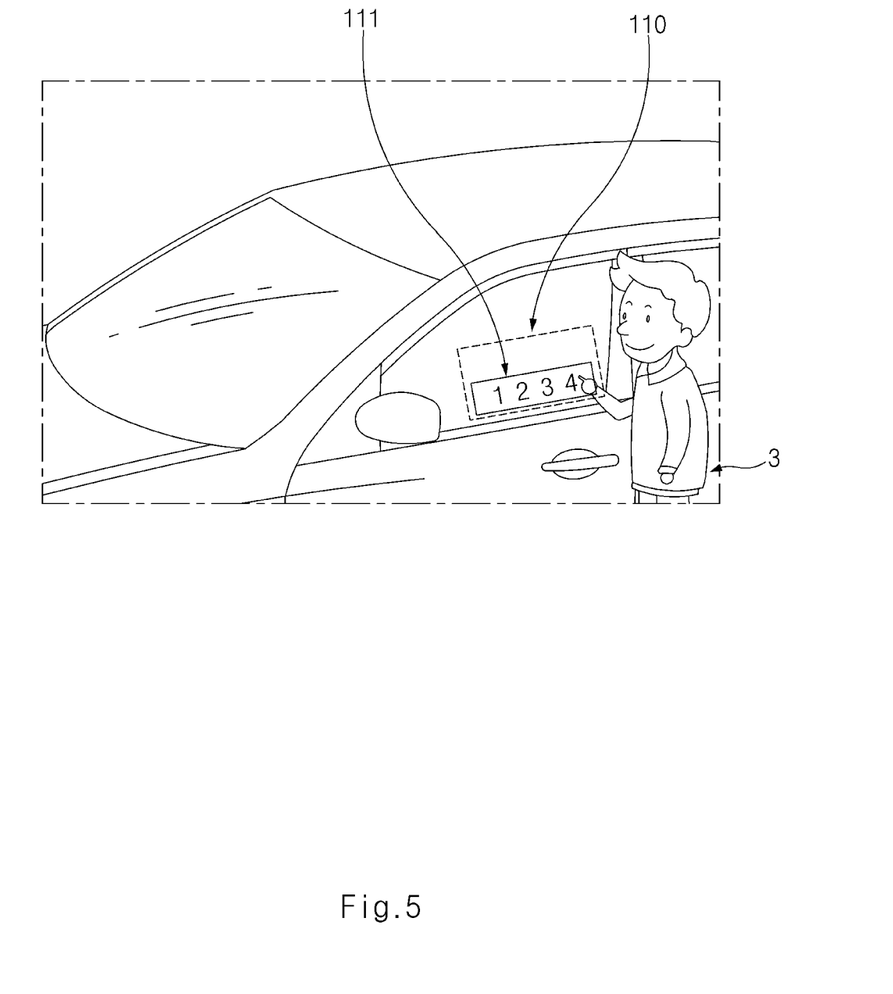
FIG. 5 is a diagram describing how a user input is received through an activated external user interface.

FIG. 5 is a diagram describing how a user input is received through an activated external user interface. As illustrated in FIG. 5, the controller 100 may determine whether a password is entered, based on information that the shipper 3 enters in the input region 111. The determining of the password by the controller 100 may include obtaining touch coordinates of the external user interface 110 implemented with a touch panel in time series order and extracting a rendering shape made on the surface of the external user interface 110 based on the touch coordinates. The controller 100 may determine whether characters, digits, or a pattern entered on the external user interface 110 coincides with the password, based on the rendering shape.

The opening of the door 120 may further include guiding a shipment receipt place to the shipper 3. To this end, the controller 100 may control a speaker in a vehicle, and may operate a display of the external user interface 110 in the process of opening the door 120.

Figure 6:
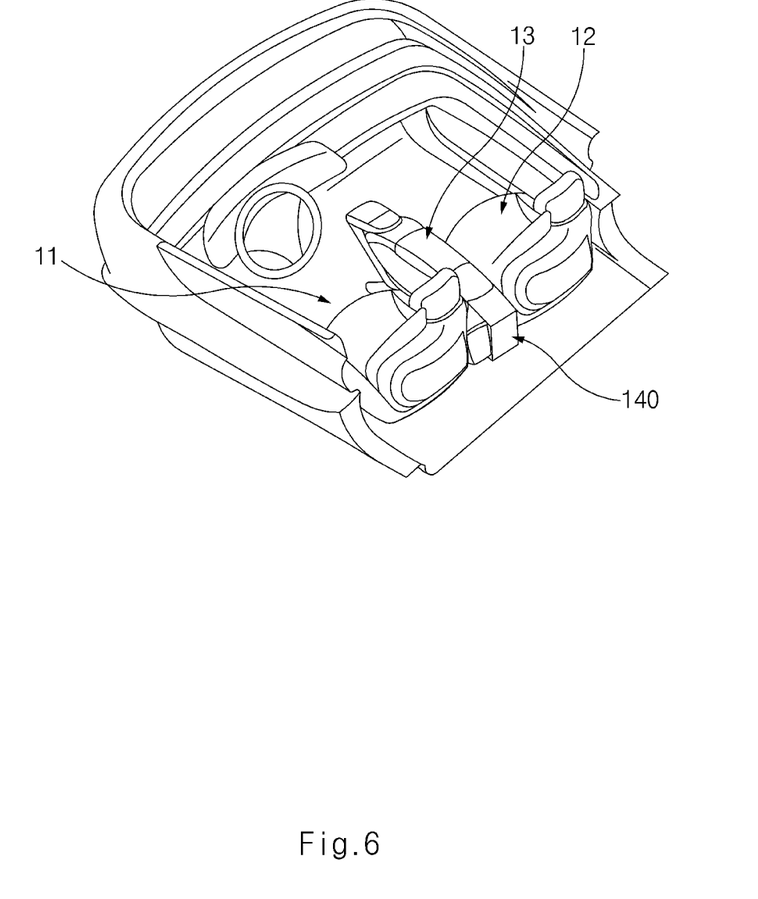
FIG. 6 is a diagram illustrating an embodiment of a shipment receipt place.

FIG. 6 is a diagram illustrating an embodiment of a shipment receipt place. As illustrated in FIG. 6, a shipment receipt place may be seats 11 and 12, a console box 13, or the refrigerator/warmer 140 in a vehicle. The shipment receipt place may be a place set in advance by a user 1, or may be selected by the shipper 3. When the shipper 3 selects the shipment receipt place, information about the shipment receipt place may be sent to the user terminal 2 over the shipper terminal 4.

The opening of the door 120 may further include checking a shipment receipt. The checking of the shipment receipt may include checking a shipment receipt position and shipment information. The shipment receipt position may be sent to the user terminal 2, and thus, the user may easily receive the shipment.

To check the shipment receipt position, the controller 100 may operate the camera 160 for monitoring the interior of a vehicle, and may check the shipment receipt position based on an image obtained through the camera 160.

Also, the controller 100 may check the shipment receipt position based on shipping completion information provided through the shipper terminal 4. That is, the shipper 3 may send the shipping completion information to the user terminal 2 through the shipper terminal 4; in this case, the shipping completion information may also be sent to the vehicle 10.

In S340, the controller 100 may adjust a temperature in the vehicle 10 based on the shipment information.

The temperature in the vehicle 10 may be adjusted by controlling the temperature adjustment device that is powered from the battery 70. For example, the temperature adjustment device may be the air conditioning device 130 or the refrigerator/warmer 140. The controller 100 according to an embodiment of the present disclosure may adjust an indoor temperature by controlling the air conditioning device 130 such that indoor thermal circulation is controlled. Also, the controller 100 according to an embodiment may control a refrigerator of the refrigerator/warmer 140 to keep the shipment refrigerated. In addition, the controller 100 according to an embodiment may control a warmer of the refrigerator/warmer 140 to keep the shipment warm. The controller 100 may control any one temperature adjustment device; also, the controller 100 may control two or more temperature adjustment devices complexly.

To control the temperature adjustment device, the controller 100 may check a storage temperature of the shipment from the shipment information. The storage temperature of the shipment may be classified as "refrigeration", "room temperature", "high temperature", or "temperature-independent".

The controller 100 may operate a refrigeration function of the air conditioning device 130 based on the storage temperature of the shipment being classified as "refrigeration". Also, the controller 100 may operate a heater function of the air conditioning device 130 based on the storage temperature of the shipment being classified as "high temperature". In addition, based on the storage temperature of the shipment being classified as "room temperature", the controller 100 may operate the refrigeration function or the heater function of the air conditioning device 130 such that a temperature in a vehicle is maintained at a room temperature (i.e., a range in which about 18 degrees are selected). The controller 100 may not operate the temperature adjustment device based on the storage temperature of the shipment being classified as "temperature-independent".

The controlling of the air conditioning device 130 by the controller 100 may include outdoor air circulation. When the shipment is unsealed food, the controller 100 may prevent the smell of food from being permeated in the interior of the vehicle 10 through the outdoor air circulation.

Figure 7:
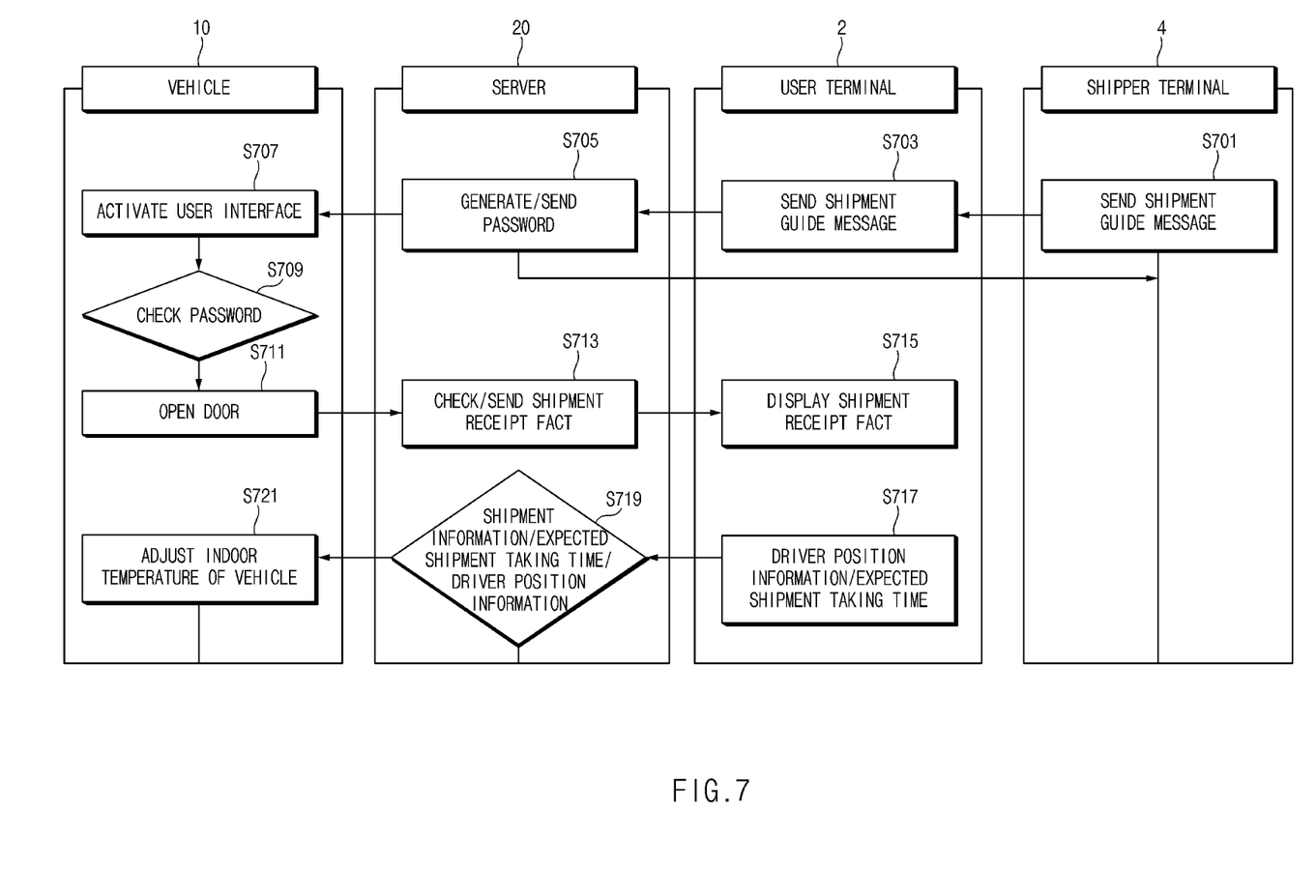
FIG. 7 is a flowchart describing a shipment pickup method using a vehicle, according to another embodiment of the present disclosure.

FIG. 7 is a flowchart describing a shipment pickup method using a vehicle, according to another embodiment of the present disclosure.

A vehicle-based shipment pickup method according to another embodiment of the present disclosure will be described with reference to FIGS. 1, 2, and 7.

In S701, the shipper terminal 4 may send a shipping guide message to the user terminal 2. The shipping guide message may include shipment information. The shipper 3 may ship the shipment ordered online or offline, and may check shipment information provided from a shipment seller through the shipper terminal 4.

In S703, the user terminal 2 may select a shipment receipt place based on the shipping guide message provided from the shipper terminal 4. The shipment receipt place may be a place, in which the user 1 stays during a given time, such as home or a company, or may be classified as a vehicle located a place that is close to a place where the user 1 stays. When the shipment receipt place is selected to be the vehicle 10, the user terminal 2 may send vehicle information to the server 20. The vehicle information may refer to information for allowing a shipper to quickly find a vehicle selected by a user and may include information such as a vehicle number, a vehicle kind, a vehicle color, and a parking position.

In an embodiment of the present disclosure, when the shipment receipt place is selected to be the vehicle 10, the user terminal 2 may send the shipping guide message provided from the shipper terminal 4 to the server 20.

In operation S705, the server 20 may generate a password. The server 20 may send a shipment pickup request including the password to the vehicle 10. Also, the server 20 may send the password to the shipper terminal 4. The password may refer to information for confirming a shipper is permitted to open a door of the vehicle 10.

In S707, the vehicle 10 may activate the external user interface 110. To this end, the controller 100 of the vehicle 10 may activate the external user interface 110 in response to the shipment pickup request and may provide a guide message requesting the shipper to enter a password through the external user interface 110.

In S709, the vehicle 10 may check the password entered through the external user interface 110. The controller 100 of the vehicle 10 may obtain touch coordinates based on a touch input entered to the touch panel of the external user interface 110 and may determine whether a rendering image obtained based on the touch coordinates coincides with the password.

In S711, the vehicle 10 may open the door 120 based on the information input through the external user interface 110 coinciding with the password provided from the server 20. Next, the controller 100 of the vehicle 10 may send the fact that the door 120 is opened and the shipment is received, to the server 20 through the communication device 170. The shipment receipt fact may include an image of the shipment received in the vehicle 10. To this end, the controller 100 of the vehicle 10 may operate the camera 160 in the process of opening the door 120. The controller 100 may obtain an indoor image being a result of photographing the interior of a vehicle through the camera 160 after a given time and may send the obtained indoor image to the server 20.

In S713, the server 20 may check the shipment receipt fact and may provide the shipment receipt fact to the user terminal 2.

In S715, the user terminal 2 may display the shipment receipt fact provided from the server 20. That is, the user terminal 2 may display the fact that the shipment is received in the vehicle 10, together with the indoor image of the vehicle 10.

In S717, the user terminal 2 may send driver position information or an expected shipment taking time to the server 20. The expected shipment taking time may mean an expected time at which the user arrives at the vehicle 10 and takes the shipment, and the user terminal 2 may display the expected shipment taking time based on an input of the user.

In S719, the server 20 may send the driver position information or the expected shipment taking time to the vehicle 10. The server 20 may send the driver position information or the expected shipment taking time received from the user terminal 2 to the vehicle 10.

In S721, the vehicle 10 may control an indoor temperature of the vehicle 10 based on the shipment information, the driver position information, and the expected shipment taking time.

The controller 100 of the vehicle 10 may check a storage temperature of the shipment based on the shipment information, and may control the temperature adjustment device depending on the storage temperature of the shipment information.

Also, the controller 100 of the vehicle 10 may adjust an operating time of the temperature adjustment device based on the driver position information and the expected shipment taking time.

A detailed method of S721 will be described with reference to FIGS. 8 and 9.

In the embodiment illustrated in FIG. 7, a function of the server 20 may be implemented by an application installed in the user terminal 2. The application may interwork with the shipper terminal 4 and the vehicle 10 and may perform the function of the server 20 illustrated in FIG. 7.

For example, the application of the user terminal 2 may generate a password based on the shipping guide message provided from the shipper terminal 4 and may send the password to the vehicle 10.

Also, the application of the user terminal 2 may display the shipment receipt fact provided from the vehicle 10 through a display of the user terminal 2.

Figure 8:
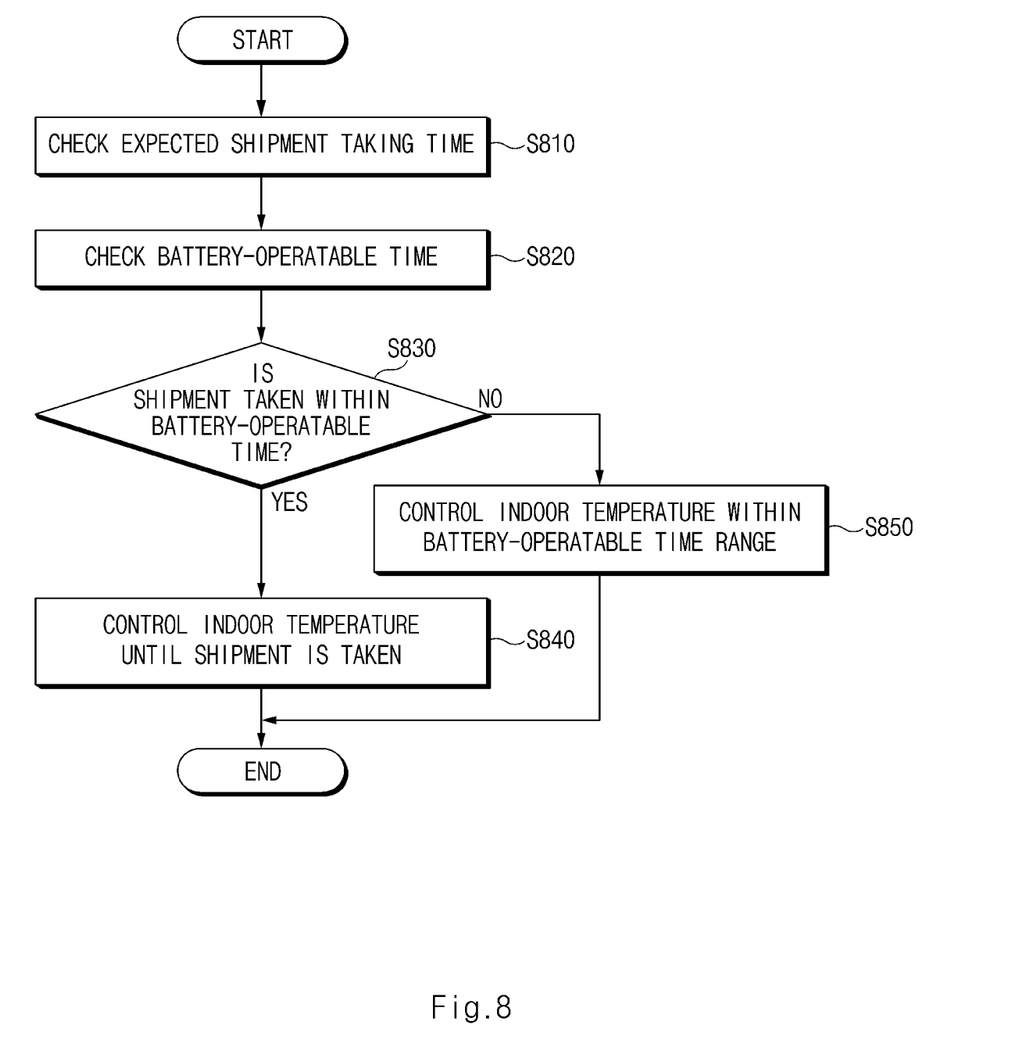
FIG. 8 is a flowchart describing an indoor temperature adjusting method of a vehicle according to an embodiment of the present disclosure.

FIG. 8 is a flowchart describing an indoor temperature adjusting method of a vehicle according to an embodiment of the present disclosure.

An embodiment of an indoor temperature adjusting method of a vehicle will be described with reference to FIG. 8.

In S810, the controller 100 may check an expected shipment taking time. The expected shipment taking time may be a time at which the user takes the shipment put in the vehicle 10.

The expected shipment taking time may be sent to the vehicle 10 through the user terminal 2 under control of the user 1.

Also, the controller 100 of the vehicle 10 may estimate the expected shipment taking time based on user position information. For example, the controller 100 may check the user position information from the user terminal 2 and may calculate an arrival time of the user.

Also, to check the expected shipment taking time, the controller 100 may send a message querying the expected shipment taking time to the user terminal 2.

In S820, the controller 100 may check a battery-operable time (i.e., a time that the battery can operate). The controller 100 may check the SOC of the battery 70 through the battery sensor 150 and may check the operable time of the battery 70 based on the SOC. The battery-operable time may mean a time during which the air conditioning device 130 or the refrigerator/warmer 140 is able to operate by using the battery 70.

In S830, the controller 100 may compare the expected shipment taking time and the battery-operable time and may determine whether the user takes the shipment within the battery-operable time.

When it is possible to take the shipment within the battery-operable time, in S840, the controller 100 may control the indoor temperature until the shipment is taken. That is, the controller 100 may control the in-vehicle temperature until the user takes the shipment.

When it is impossible to take the shipment within the battery-operable time, in S850, the controller 100 may control the indoor temperature within the battery-operable time range. For example, when the battery-operable time is 1 hour and 30 minutes and the expected shipment taking time is 2 hours, the controller 100 may allow an in-vehicle temperature to be adjusted during 1 hour and 30 minutes or less, and thus, the battery 70 may be prevented from being discharged.

The controller 100 may control an indoor temperature such that a time to take the shipment coincides with a time to terminate an indoor temperature control. For example, when the time to take the shipment is 90 minutes or more and the time to terminate an indoor temperature control is set to 60 minutes, the controller 100 may turn on the temperature adjustment device after 30 minutes.

Alternatively, the controller 100 may alternately set a turn-on time and a turn-off time of the temperature adjustment device until the shipment is taken. For example, when the time to take the shipment is 90 minutes and the time to terminate an indoor temperature control is set to 60 minutes, the controller 100 may turn on the temperature adjustment device for the initial 30 minutes. The controller 100 may turn on the temperature adjustment device for the initial 30 minutes, may turn off the temperature adjustment device for 30 minutes, and may then turn on the temperature adjustment device during the next 30 minutes.

Figure 9:
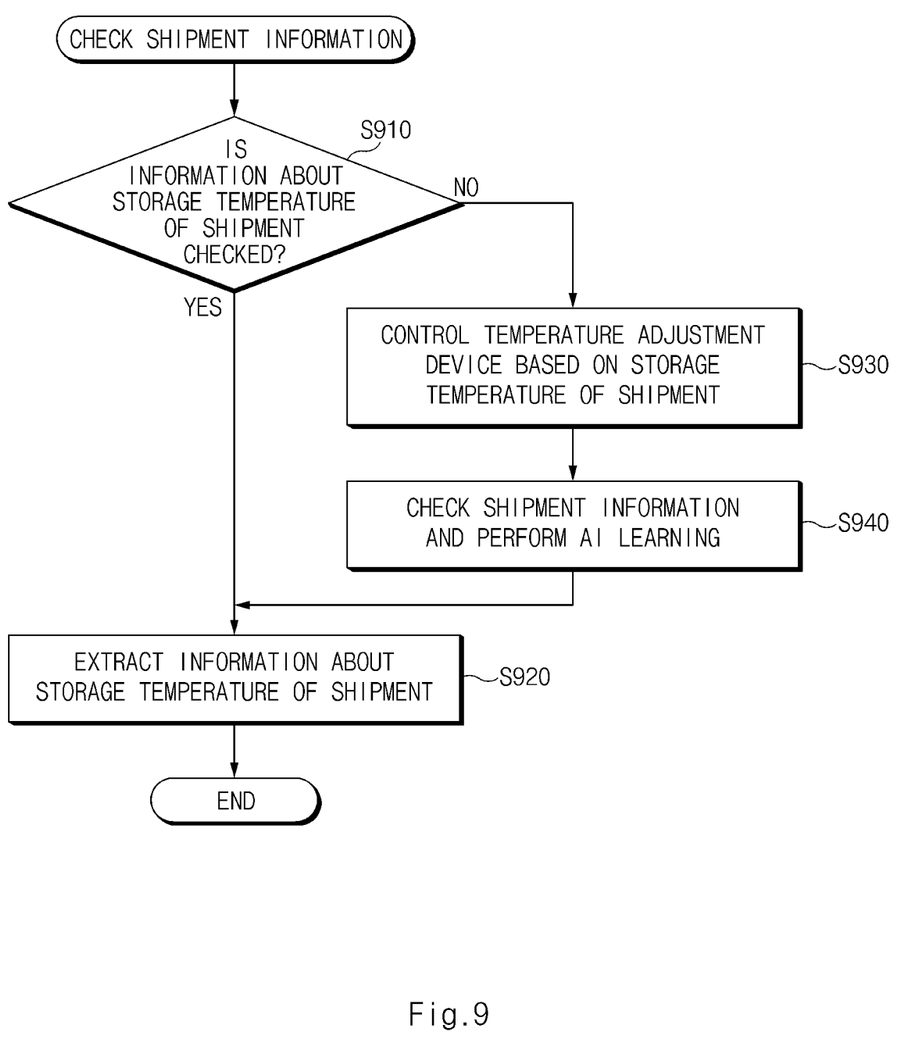
FIG. 9 is a flowchart describing an in-vehicle temperature adjusting method according to an embodiment of the present disclosure.

FIG. 9 is a flowchart describing an in-vehicle temperature adjusting method according to an embodiment of the present disclosure.

An in-vehicle temperature adjusting method according to an embodiment of the present disclosure will be described with reference to FIG. 9.

In S910, the controller 100 may attempt to check information about a storage temperature of the shipment.

When the information about the storage temperature of the shipment is checked, in S920, the controller 100 may control the temperature adjustment device based on the information about the storage temperature of the shipment.

When the information about the storage temperature of the shipment is not checked, in S930 and S940, the controller 100 may check shipment information. To extract the information about the storage temperature of the shipment, the controller 100 may learn the shipment information based on artificial intelligence (AI). To this end, the controller 100 may include an AI processor. The AI processor may train a neural network by using a program stored in advance. The neural network for adjusting an indoor temperature of a vehicle may be designed to mimic a human's brain structure on a computer and may include a plurality of weight-based network nodes that mimic neurons of the human brain. The plurality of network nodes may exchange data depending on the connection relationship such that each neuron mimics the synaptic activity of neurons exchanging signals through synapses. The neural network may include a deep learning model developed from a neural network model. In the deep learning model, a plurality of network nodes may exchange data depending on the convolution connection relationship in a state of being located in different layers. As an example, the neural network model may include a variety of deep learning techniques such as a deep neural network (DNN), a convolutional deep neural network (CNN), a recurrent neural network (RNN), a restricted Boltzmann machine (RBM), a deep belief network (DBN), or a deep Q-network.

A training target of the AI model for adjusting an indoor temperature may be shipment information, and an AI learning result may be a storage temperature of the shipment. For example, the AI processor may extract information about the storage temperature of the shipment based on the name of the shipment, a manufacturer, a seller, and a user's requests for shipping.

After extracting the storage temperature of the shipment, the controller 100 may control the temperature adjustment device based on the storage temperature of the shipment.

Figure 10:
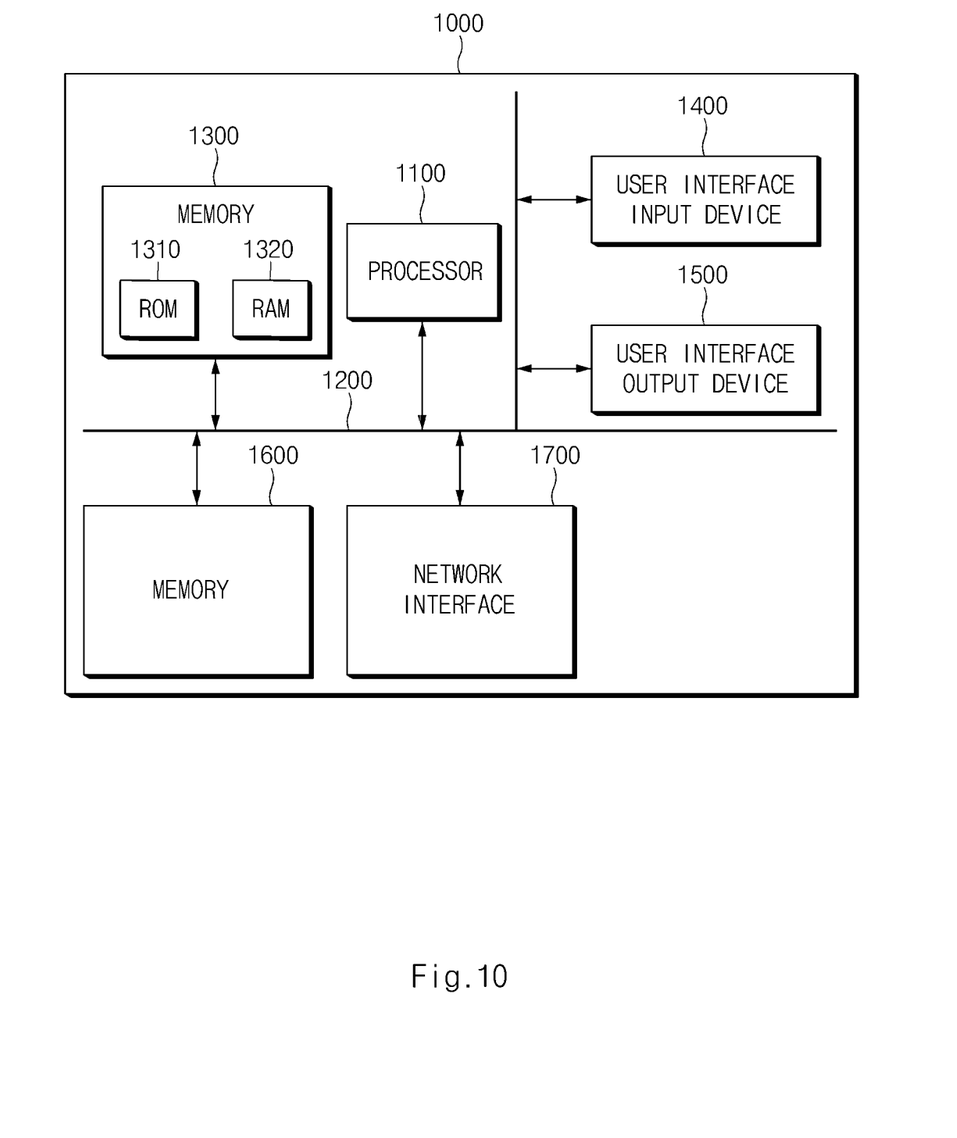
FIG. 10 is a diagram illustrating a computing system according to an embodiment of the present disclosure.

FIG. 10 is a diagram illustrating a computing system according to an embodiment of the present disclosure.

Referring to FIG. 10, a computing system 1000 may include at least one processor 1100, a memory 1300, a user interface input device 1400, a user interface output device 1500, a memory (i.e., storage) 1600, and a network interface 1700, which are connected over a bus 1200.

The processor 1100 may be a central processing unit (CPU) or a semiconductor device that processes instructions stored in the memory 1300 and/or the memory 1600. Each of the memory 1300 and the memory 1600 may include various types of volatile or nonvolatile storage media. For example, the memory 1300 may include a read only memory (ROM) and a random access memory (RAM).

Accordingly, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the memory 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and the storage medium may be implemented with an application specific integrated circuit (ASIC). The ASIC may be provided in a user terminal. Alternatively, the processor and the storage medium may be implemented with separate components in the user terminal.

According to an embodiment of the present disclosure, because the product is taken by using a vehicle in which a privacy of a user is secured, it may be possible to receive the shipment more safely.

According to an embodiment of the present disclosure, because a temperature of the shipment is appropriately maintained by using a temperature adjustment device of the vehicle, the quality of the shipment may be prevented from being degraded due to a temperature change.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle comprising:
   a communication device configured to communicate with a device outside the vehicle;
   an external user interface configured to be exposed to a shipper of a shipment;
   a temperature adjustment device configured to adjust an indoor temperature; and
   a controller configured to:
     receive a shipment pickup request generated by a user terminal of a recipient of the shipment, wherein the shipment pickup request comprises password information and shipment information;
     activate the external user interface in response to the shipment pickup request;
     cause a door of the vehicle to be opened based on information entered through the external user interface being a password based on the password information;
     operate the temperature adjustment device based on receipt of the shipment; and
     control the temperature adjustment device based on information about the shipment information.

2. The vehicle of claim 1, wherein the controller is configured to:
   receive information about an input time limit of the password with the shipment pickup request; and
   activate the external user interface during the input time limit.

3. The vehicle of claim 1, wherein the external user interface comprises a touch panel exposed on at least a portion of an outer region of the vehicle.

4. The vehicle of claim 1, wherein the controller is configured to control a speaker to guide a storage position of the shipment when the door is opened.

5. The vehicle of claim 1, wherein the controller is configured to:
   obtain an indoor image where the shipment is located, after the door is opened; and
   send the indoor image to the user terminal.

6. The vehicle of claim 1, wherein the controller is configured to:
   check a storage temperature of the shipment from the shipment pickup request; and
   control the temperature adjustment device based on the storage temperature.

7. The vehicle of claim 1, wherein the controller is configured to:
   perform artificial intelligence learning on the shipment information to extract a storage temperature of the shipment; and
   control the temperature adjustment device based on the storage temperature.

8. The vehicle of claim 1, wherein the temperature adjustment device comprises an air conditioning device, a refrigerator, or a warmer.

9. The vehicle of claim 1, wherein the controller is configured to:
   determine an operable time of a battery powering the temperature adjustment device;
   determine a time to take the shipment; and
   set a driving time of the temperature adjustment device to be the operable time or less in response to the time to take the shipment being greater than the operable time.

10. A method for picking up a shipment using a vehicle, the method comprising:

receiving a shipment pickup request generated by a user terminal of a recipient of the shipment, wherein the shipment pickup request comprises password information and shipment information, the password information including a password;

activating an external user interface of the vehicle in response to the shipment pickup request;

opening a door of the vehicle based on the password being entered through the external user interface;

operating a temperature adjustment device based on receipt of the shipment; and adjusting a temperature in the vehicle based on the shipment information about of the shipment received in the vehicle through the opened door, the temperature being adjusted by controlling the temperature adjustment device.

11. The method of claim 10, wherein receiving the shipment pickup request further comprises receiving information about an input time limit of the password.

12. The method of claim 10, wherein activating the external user interface comprises activating a touch panel exposed on a portion of an outer region of the vehicle.

13. The method of claim 10, wherein opening the door of the vehicle comprises:

operating a speaker of the vehicle; and guiding a storage position of the shipment through the speaker.

14. The method of claim 10, further comprising:

after opening the door of the vehicle, obtaining an indoor image where the shipment is located; and sending the indoor image to the user terminal.

15. The method of claim 10, wherein receiving the shipment pickup request comprises receiving information about a storage temperature of the shipment.

16. The method of claim 10, wherein adjusting the temperature in the vehicle comprises:

performing artificial intelligence learning on the shipment information to extract information about a storage temperature of the shipment; and adjusting the temperature in the vehicle based on the storage temperature.

17. The method of claim 10, wherein adjusting the temperature in the vehicle comprises controlling an air conditioning device, a refrigerator, or a warmer as the temperature adjustment device.

18. The method of claim 17, wherein adjusting the temperature in the vehicle further comprises:

determining an operable time of a battery powering the temperature adjustment device;

determining a time to take the shipment; and setting a driving time of the temperature adjustment device to the operable time or less in response to the time to take the shipment being greater than the operable time.

19. A vehicle comprising:

a communication device configured to communicate with a device outside the vehicle;

a touch panel exposed on at least a portion of an outer region of the vehicle;

a temperature adjustment device configured to adjust an indoor temperature; and a controller configured to:

receive a shipment pickup request generated by a user terminal of a recipient of a shipment, wherein the shipment pickup request comprises password information and shipment information;

activate the touch panel in response to the shipment pickup request;

cause a door of the vehicle to be opened based on information entered through the touch panel being a password based on the password information;

control a speaker to guide a storage position of the shipment when the door is opened;

operate the temperature adjustment device based on receipt of the shipment; and control the temperature adjustment device based on the shipment information.

20. The vehicle of claim 19, wherein the controller is configured to:

obtain an indoor image where the shipment is located; and send the indoor image to the user terminal.

* * * * *